United States Patent
Gardner et al.

(10) Patent No.: US 7,250,484 B2
(45) Date of Patent: Jul. 31, 2007

(54) METHOD FOR PRODUCING ENHANCED SOLID STATE

(75) Inventors: Michael William Gardner, North Yorkshire (GB); Jill Barbara Cunningham, Cleveland (GB); Derek J. Winter, Middlesbrough (GB); Stephen D. Jenkins, Cleveland (GB)

(73) Assignee: Invista North America S.AR.L., Wilmington, DE (US)

( * ) Notice: Subject to any disclaimer, the term of this patent is extended or adjusted under 35 U.S.C. 154(b) by 0 days.

(21) Appl. No.: 10/978,587

(22) Filed: Nov. 1, 2004

(65) Prior Publication Data
US 2005/0101758 A1 May 12, 2005

(30) Foreign Application Priority Data
Nov. 6, 2003 (GB) .................................. 0325952.0

(51) Int. Cl.
*C08G 63/02* (2006.01)

(52) U.S. Cl. ....................... 528/272; 528/288; 528/292; 528/302; 528/308; 528/308.6; 528/437; 528/444

(58) Field of Classification Search ................ 528/288, 528/292, 302, 308, 308.6, 437, 444; 525/437, 525/444
See application file for complete search history.

(56) References Cited

U.S. PATENT DOCUMENTS

| 3,365,425 | A | 1/1968 | Watson |
| 3,454,672 | A | 7/1969 | Jackson, Jr. et al. |
| 3,501,420 | A | 3/1970 | Stevenson |
| 3,546,177 | A | 12/1970 | Kibler et al. |
| 3,575,927 | A | 4/1971 | Jackson, Jr. et al. |
| 3,728,287 | A | 4/1973 | Burmaster |
| 3,849,514 | A | 11/1974 | Gray, Jr. et al. |
| 3,890,279 | A | 6/1975 | Wolfe, Jr. |
| 4,127,557 | A | 11/1978 | Deex et al. |
| 4,199,493 | A | 4/1980 | Baer |
| 4,223,126 | A * | 9/1980 | Keck .......................... 528/305 |
| 5,204,377 | A * | 4/1993 | Fukawa et al. ............... 521/60 |
| 5,258,445 | A | 11/1993 | Sperk, Jr. et al. |
| 5,519,094 | A | 5/1996 | Tseng et al. |
| 5,552,463 | A | 9/1996 | Akkapeddi et al. |
| 6,111,697 | A | 8/2000 | Merrill et al. |
| 6,352,761 | B1 | 3/2002 | Hebrink et al. |
| 2003/0139566 | A1 | 7/2003 | Parthasarathy |

OTHER PUBLICATIONS

Kint et al., "Poly(ethylene terephthalate) Copolymers Containing 5-Nitroisophthalic Units. I. Synthesis and Characterization", J. of Polymer Sc., Part A, Polymer Chemistry, vol. 38, Jun. 2000, pp. 1934-1942.*

Kint et al., "Poly(ethylene terephthalate) Terpolyesters Containing . . . " J. of Polymer Sc., Part A, Polymer Chemistry, vol. 41, No. 1, Jan. 2003, pp. 124-134.*

Kint et al., "Poly(ethylene terephthalate) Terpolyesters Containing . . . ", Journal of Polymer Science, Part A, Polymer Chemistry, vol. 41, No. 1, Jan. 2003, pp. 124-134.

Kint et al., "Poly(ethyelne Terephthalate) Copolymers Containing . . . ", Journal of Polymer Science, Part A, Polymer Chemistry, vol. 38, Jun. 2000, pp. 1934-1942.

* cited by examiner

*Primary Examiner*—Terressa Boykin

(57) ABSTRACT

A method for enhancing solid state polymerization of polyethylene terephthalate is disclosed in which at least one monomeric unit of diacid and/or dimethyl ester comprising at least one pendant chemical side group is copolymerized with a diol and a diacid or a dimethyl ester. The at least one pendant chemical side group may include groups chosen from tertiary butyl, hexyl, pentyl, butyl, propyl, ethyl, methyl, nitrosyl ($NO_2$) and sulfonyl ($SO_2$) groups.

8 Claims, 7 Drawing Sheets

METHOD FOR PRODUCING ENHANCED SOLID STATE

FIELD OF THE INVENTION

This invention relates to methods of enhancing solid state polymerization of polyethylene terephthalate through the copolymerization of at least one monomeric unit comprising at least one pendant chemical side group with other precursor materials.

BACKGROUND OF THE INVENTION

Polyethylene terephthalate (PET) is widely used in many materials and products, such as fibers, fabrics, molding resins, and soda bottles. These uses often require a polymer of relatively high molecular weight. Such polymers have been commercially made by raising, either in melt or solid-state polymerization, the molecular weight of a prepolymer or oligomer (i.e., raising the molecular weight of a relatively low molecular weight polymer feedstock). The prepolymer or oligomer is typically prepared by copolymerizing precursor materials, which are typically monomeric units of at least one diacid or diester and at least one glycol, such as, for example, terephthalic acid and ethylene glycol.

Melt polymerizations to high viscosities typically involve expensive plant equipment and require relatively high temperatures, which can accelerate polymer degradation reactions. Typical temperatures for melt polymerizations are between 250 and 310° C. In contrast, solid-state polymerizations are typically run at relatively lower temperatures, typically between temperatures of 160 and 230° C. In addition, solid state polymerizations can result in the production of relatively high molecular weight materials, typically 0.55 dL/g to 1.5 dL/g, compared with melt polymerizations, typically up to 0.65 dL/g. However, in commercial production, solid-state polymerizations may be relatively slow, typically 0.015 to 0.025 dL/g per hour. As a result, there exists a need to enhance the solid state polymerization reactivity to more efficiently produce higher molecular weight polymers.

SUMMARY OF THE INVENTION

In a first aspect, the present invention relates to methods of enhancing solid state polymerization of copolymers of PET. In this first aspect, at least one diol and at least one diacid or dimethyl ester are copolymerized with at least one monomeric unit selected from the group consisting of diacids and dimethyl esters that contain at least one pendant side group. The at least one pendant chemical side group may include groups chosen from tertiary butyl, hexyl, pentyl, butyl, propyl, ethyl, methyl, nitrosyl ($NO_2$), and sulfonyl ($SO_2$) groups. In a second aspect, the present invention relates to a polymer of PET produced by the same methods.

An example of a monomer having a tertiary butyl side group that may be used in the invention is tertiary butyl isophthalic acid. Examples of monomers having a nitrosyl side group that may be used in the invention include 5-nitroisophthalic acid and dimethyl 5-nitroisophthalate. When tertiary butyl isophthalic acid is used in the invention it may, for example, be present in an amount ranging from about 0.1 to about 8 mole percent of the total diacid content of the PET, such as from about 0.1 to about 4 mole percent of the total diacid content of the PET. When 5-nitroisoisophthalic acid is used in the invention it may, for example, be present in an amount ranging from about 0.05 to about 8 mole percent of the total diacid content of the PET, such as from about 0.05 to about 2 mole percent of the total diacid content of the PET.

The methods of the present invention can result in an increase of intrinsic viscosity per hour during solid state polymerization that is at least five percent greater than the average intrinsic viscosity rate for solid state polymerization of PET without at least one monomeric unit having at least one pendant side group, when the solid state polymerization is carried out at temperatures in the range of about 200 to about 230° C. Under such conditions, the methods of the present invention, can, for example, result in solid state polymerization of PET where the average intrinsic viscosity rate increase is at least about 0.03 dL/g per hour.

BRIEF DESCRIPTION OF THE DRAWINGS

The present invention will be described in the following detailed description with reference to the following drawings.

DETAILED DESCRIPTION OF THE INVENTION

Figure 1:
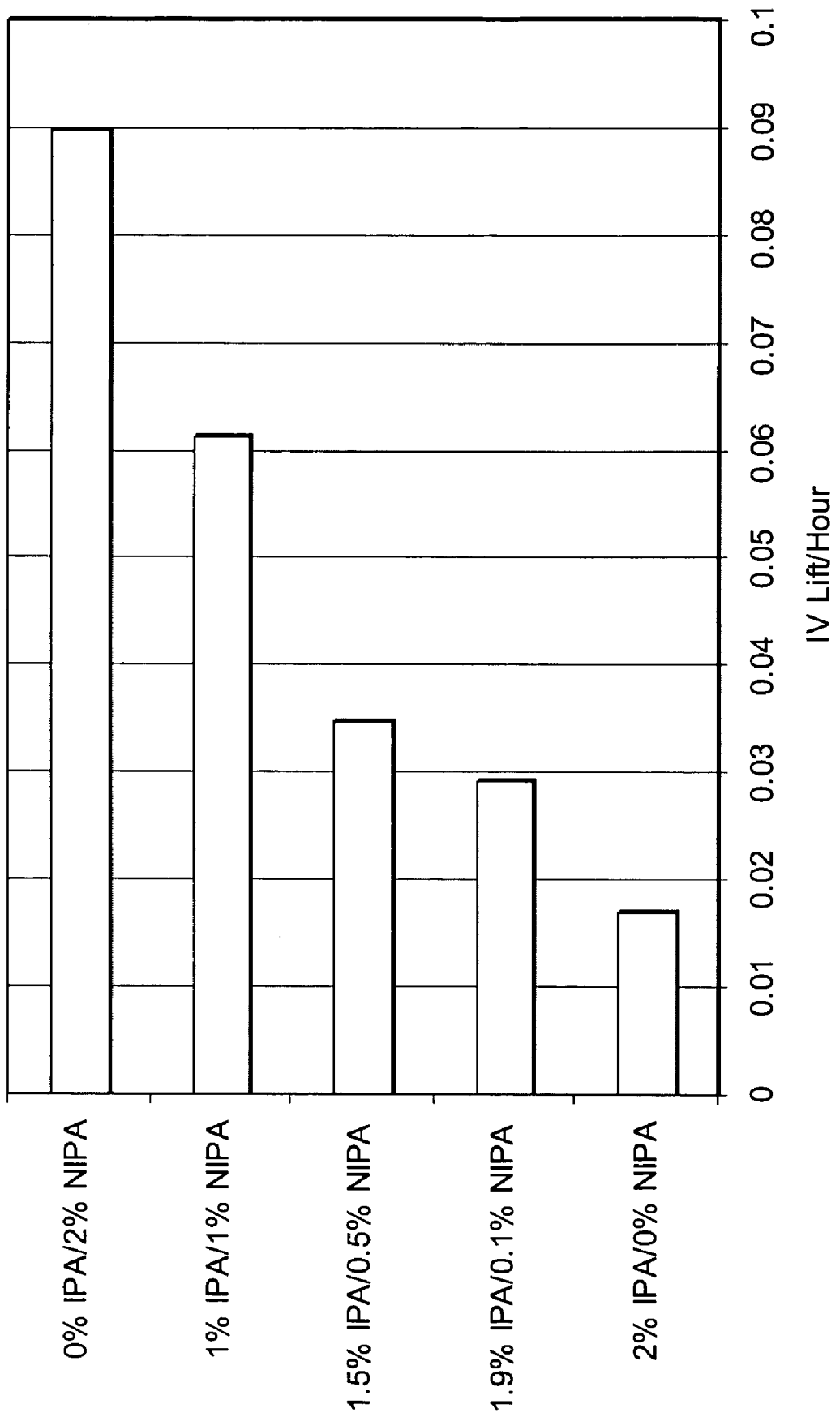
FIG. 1 is a plot of solid state polymerization reactivity rates for formulations of Example 1.

The present invention relates to methods of enhancing solid state polymerization (SSP) of PET. In particular, the present invention relates to enhancing the SSP reactivity of PET by copolymerizing at least one monomer comprising at least one pendant chemical side group with other precursor materials.

SSP of PET often occurs at reaction temperatures exceeding 200° C. in the flow of an inert gas, such as nitrogen. For a conventional PET resin, the rate of this reaction is often predominately determined by reaction temperature and gas flow rate. However, other factors, such as carboxyl/hydroxyl end group balance, catalyst residues, and copolymer level (including diethylene glycol), can also affect SSP reactivity.

In the production of higher molecular weight polymers via SSP, there exists a need to enhance SSP reactivity. By enhancing such reactivity, SSP production rates may be improved for the same reaction temperature, or reaction temperatures can be lowered while maintaining existing throughputs. Lower temperature reactions have the advantage of yielding resins with improved processing characteristics such as lower injection molding temperatures, reduced levels of degradation products and lower energy consumption.

According to the present invention, solid state polymerization of PET may be enhanced by copolymerizing at least one monomer comprising at least one pendent chemical side group with other precursor materials. The other precursor materials can include diacids, dimethyl esters, and diols chosen from, for example: terephthalic acid, isophthalic acid, dimethyl terephthalate, naphthalene, napthoic acid, 1,4-dicarboxylic acid, 2,6-dicarboxylic acid, sebacic acid, decane 1,10-dicarboxylic acid, ethylene glycol, diethylene glycol, propylene glycol, butane 1,4-diol, polytetramethylene glycol, polyethylene glycol, polypropylene glycol, and 1,4 hydroxymethyl cyclohexane.

The monomers comprising at least one pendant chemical side group can include diacids and dimethyl esters. The at least one pendant chemical side group may include groups chosen from tertiary butyl, hexyl, pentyl, butyl, propyl, ethyl, methyl, nitrosyl ($NO_2$), and sulfonyl ($SO_2$) groups. An example of a monomer comprising a tertiary butyl side group is tertiary butyl isophthalic acid. Examples of monomers comprising a nitrosyl side group include 5-nitroisophthalic acid and dimethyl 5-nitroisophthalate.

Examples of methods for making PET, which relate to the present invention, are summarized below. Methods 1-3 describe methods for preparing relatively low molecular weight prepolymer feedstock. Methods 4a, 4b, and 5 describe methods for SSP of the feedstock produced in methods 1-3, in order to produce a higher molecular weight polymer.

Method 1—Preparation of Terephthalic Acid (TA) Based Feedstock

Ethylene glycol (Dow Chemical Company); terephthalic acid (DuPont Polyester Europe SA); and isophthalic acid (BP Chemicals), 5-tert-butylisophthalic acid (Sigma Aldrich, Inc.), or 5-nitroisophthalic acid (Sigma Aldrich, Inc.) are polymerized under nitrogen in a heated steel vessel which is equipped with an agitator, a condenser, and a high pressure/vacuum facility. The pressure in the autoclave is increased to 3 Barg over a period of one minute, and the vessel temperature is also increased to heat the batch contents up to 255° C. Polymerization then proceeds with the removal of water. After 75% of the theoretical amount of water has been removed, the pressure in the vessel is reduced to atmospheric pressure over a period of ten minutes. A solution of phosphoric acid and phosphorous acid in ethylene glycol is added to the vessel. After 5 minutes, a slurry of antimony trioxide (Sigma Aldrich, Inc.) and cobalt acetate tetrahydrate (Sigma Aldrich, Inc.) in ethylene glycol is added to the autoclave. The pressure in the autoclave is then reduced to less than 1 mBar over a period of 30 minutes. Polymerization then proceeds with the removal of ethylene glycol. The melt viscosity of the batch is monitored using agitator power consumption as an indicator. A table correlating power consumption with intrinsic viscosity (IV) is used to estimate the reaction endpoint corresponding to an IV of approximately 0.65 dl/g. The vacuum is then reduced to approximately 50 mBar, and the polymer is then cast, quenched in water and cut into chips.

Method 2—Preparation of Dimethyl Terephthalate (DMT) Based Feedstock

Dimethyl terephthalate (DuPont Polyester Europe SA) and ethylene glycol are polymerized in a heated steel vessel which is equipped with an agitator, a condenser, and a high pressure/vacuum facility. The resulting slurry is heated from 150 to 270° C. under nitrogen at atmospheric pressure. The reaction evolves methanol, which is separated, condensed and collected in a receiver system. When 90% of the theoretical volume of methanol has been collected the remainder is driven off and collected as a mixed glycol/methanol fraction. A solution of phosphoric acid (Sigma Aldrich, Inc.) and phosphorous acid (Sigma Aldrich, Inc.) in ethylene glycol is added to the vessel. After 5 minutes, a slurry of antimony trioxide and cobalt acetate tetrahydrate in ethylene glycol is added to the autoclave. The pressure in the autoclave is then reduced to less than 1 mBar over a period of 30 minutes. Polymerization of the monomer then proceeds with the removal of ethylene glycol. The melt viscosity of the batch is monitored using agitator power consumption as an indicator. A table correlating power consumption with intrinsic viscosity (IV) is used to estimate the reaction endpoint corresponding to an IV of approximately 0.65 dl/g. The vacuum is then reduced to approximately 50 mBar, and the polymer is then cast, quenched in water and cut into chips.

Method 3—Preparation of Polymer Feedstock

Low molecular weight polymer feedstock suitable for use in practicing the invention can be prepared according to the methods described in any of U.S. Pat. Nos. 5,510,454, 5,532,333, 5,830,982, 5,714,262, 5,633,018, 5,744,074, 5,730,913, 5,786,443, 5,670,606, 5,540,868, 5,811,496, 6,180,756, 6,409,491, and 6,451,966.

For example, U.S. Pat. No. 5,510,454 describes the preparation of low molecular weight PET crystals, which can be used as feedstock in the preparation of higher molecular weight PET by SSP. These crystals generally have a degree of polymerization of about 5 to about 35 (degree of polymerization representing the average number of repeat units in a polymer, which can be determined by Gel Permeation Chromatography), an average crystallite size of about 9 nm or more, and a melting point of about 270° C. or less. These crystals can be produced by crystallizing PET, for example, by cooling at a rate sufficient to cool a molten PET in the temperature range of from about 210° C. to about 120° C. or, alternatively, by heating at a rate sufficient to heat a glassy PET particle in the temperature range of from about 120° C. to about 210° C.

Prepolymers and oligomers intended as feedstock for higher molecular weight polyester polymers according to the invention can also be converted into particles and crystallized as described in detail in U.S. Pat. No. 5,540,868. In that case, prepolymer pellets are melted in a pellet former commonly referred to as a pastillator, and molten polymer droplets are formed by metering the polymer melt through a plurality of outlets, each typically 0.5 to 5 mm in diameter, in a rotatable container. The droplets formed are collected on a solid moving surface. The molten droplets are crystallized by being placed in contact with this solid surface between a minimum and maximum temperature as defined below, whereby they sustain a rapid change in temperature and remain between the minimum and maximum temperature long enough for crystallization to occur. The minimum temperature is defined as $T_{min}=T_g+10°$ C., where $T_g$ is the glass transition temperature of the oligomer. The maximum temperature is defined as $T_{max}=T_c+0.5(T_m-T_c)$, where $T_m$ is the melting point of the oligomer and $T_c$ is the calculated temperature of maximum crystallization rate, $T_g+0.5(T_m-T_g)$.

The crystallized particles can then be introduced to a solid state polymerization reactor of any suitable design.

Method 4a—Solid Phase Polymerization of Conventional PET using 500 g Batch Laboratory SSP Rig The polymer chips produced by, for example, Method 1 are solid phase polymerized in a heated, jacketed metal column through which heated nitrogen and air are can be passed. The column is able to contain a fully fluidized 500 g polymer batch without loss (hereinafter, this SSP equipment shall be referred to as the 500 g Batch Laboratory SSP Rig). The standard polymerization method involves crystallizing the resin, while fluidized, at a temperature of 160° C. in an air flow of 6 M³/Hr per Kg of polymer. After 10 minutes, the temperature is ramped to 208° C. and the gas switched from air to nitrogen, with a reduced flow of 1.5 M³/Hr per Kg of polymer (see Table 1).

TABLE 1

| Selected Processing Parameters for Method 4a | |
|---|---|
| Initial Charge Temperature | 160° C. |
| Dwell Time | 10 mins |
| Temperature | 208° C. |
| Ramp Time | 30 mins |
| Batch Size | 500 g |

Method 4b—Solid Phase Polymerization of Conventional PET using the 40 Kg Batch Laboratory SSP Rig The polymer chips produced by, for example, Method 1 are solid phase polymerized in a heated, jacketed metal vessel through which heated nitrogen and air can be passed. The column is able to contain a fluidized 40 Kg polymer batch without loss (hereinafter, this SSP equipment shall be referred to as the 40 Kg Batch Laboratory SSP Rig). Polymer feedstock is charged to the reactor at a temperature of 40° C. and then ramped to 85° C. over a period of 30 minutes. The material is then held at 85° C. for two minutes before increasing the temperature to 115° C. over 100 minutes. The final stage of crystallization involves raising the temperature to 210° C. over 60 minutes and then holding for two hours prior to sampling and intrinsic viscosity (IV) measurement. The reaction employs a preheated nitrogen flow of 1.5 M³/Hr per Kg of polymer at 210° C. (see Table 2).

TABLE 2

| Selected Processing Parameters for Method 4b | |
|---|---|
| Initial Charge Temperature | 40° C. |
| Stage 1 Temperature | 85° C. |
| Stage 1 Ramp Time | 30 mins |
| Stage 1 Dwell Time | 2 mins |
| Stage 2 Temperature | 115° C. |
| Stage 2 Ramp Time | 100 mins |
| Stage 2 Dwell Time | 2 mins |
| Stage 3 Temperature | 210° C. |
| Stage 3 Ramp Time | 60 mins |
| Stage 3 Dwell Time | 120 mins |
| Batch Size | 40 Kg |

Method 5—Solid Phase Polymerization of Low Molecular Weight PET using the 500 g Laboratory SSP Rig The polymer chips made according to Method 3 are solid phase polymerized by further crystallizing the resin, while fluidized, at a temperature of 190° C. in a nitrogen flow of 6 M³/Hr per Kg of polymer. After 5 minutes, the temperature is ramped to 230° C. and the nitrogen flow reduced to 1.5 M³/Hr per Kg of polymer (see Table 3).

TABLE 3

| Selected Processing Parameters for Method 5 | |
|---|---|
| Initial Charge Temperature | 190° C. |
| Dwell Time | 5 mins |
| Temperature | 230° C. |

TABLE 3-continued

| Selected Processing Parameters for Method 5 | |
|---|---|
| Ramp Time | 30 mins |
| Batch Size | 500 g |

One or more of a variety of analytical methods may be used to determine the SSP reactivity of PET polymers made according to the invention. For example, in one method, the polymer of interest is heated in a vessel through which the flow of an inert gas, such as nitrogen, is passed. During this process, melt viscosity measurements of the polymer are taken against time, with the results plotted on a graph. The slope of this graph can be used to calculate a melt viscosity increase per unit time, which can be used as a guide to SSP reactivity as compared to a reference resin. For materials where molecular interactions are believed to interfere with melt rheology, solution viscosity can be used to determine the underlying SSP reactivity.

Analytical methods that were used in the examples below include:

Melt Viscosity

Melt viscosity was measured using a Lloyd Instruments Melt Viscometer at a temperature of 295° C. A sample of previously dried PET was introduced under a nitrogen purge into the barrel of the viscometer unit. The barrel was then fitted with an interfaced transducer to measure the rate of flow of extrudate through a calibrated die. The extrudate velocity, after a five minute residence time, was controlled to a speed of between 0.5 and 1 mm/minute by adjusting the pressure within the barrel with typical operating pressures of between 5 and 30 Barg. The computer was programmed to calculate Melt Viscosity values (log10 viscosity) and equivalent intrinsic viscosities from a regression equation determined experimentally. A plot of intrinsic viscosity against time was made by the computer and the degradation rate was calculated. An extrapolation of the graph to zero time gave the initial intrinsic viscosity and equivalent melt viscosity in Pascal seconds.

Solution Viscosity

Solution viscosities were measured using a U tube viscometer at a temperature of 25° C. The sample was dissolved in O-Chlorophenol (Assay min 98%) under reflux conditions, cooled and then measured versus a solvent standard. Each sample was measured four times to ensure that the results were repeatable otherwise, the viscometer was cleaned and the sample reanalyzed.

Hydroxyl End Group (HEG) and Diethylene Glycol Determination (DEG)

HEG and DEG were measured by Nuclear Magnetic Resonance (NMR). The polymer sample was added to deuterated d2-1,1,2,2, tetrachloroethane (TCE) and heated to 120° C. to dissolve. If the material was found to be highly crystalline, it was hot pressed and then quenched to form an amorphous film before dissolving in the normal manner (this method helps reduce thermal degradation of the sample incurred when dissolution rates are low). The sample was then transferred to a 5 mm NMR tube and placed in a Jeol Eclipse 400 or 500 MHz instrument (although, any instrument with a field strength greater than 270 MHz may be used). The resonances shown on the spectra were integrated, from which the levels of DEG (Mole %) and OH (endgroups per 100 polymer repeat units) were calculated.

Instrument conditions for DEG and OH determination were as follows:

| Nucleus Observed: | 1H |
|---|---|
| Frequency of Observation: | 400/500 MHz |
| Solvent: | TCE |
| Spectral Width: | 10 ppm |
| Acquisition Time: | 1.3 seconds |
| Pulse Length: | 6.35 microseconds |
| Pulse Delay: | 1 second |
| Number of Scans: | 400 |
| Chemical Shift Reference: | 6.0 ppm |
| Offset: | 125.8 KHz |
| Decoupler Mode: | None |
| Temperature Control: | 100° C. |

Carboxyl End Group (CEG) Determination

The CEG concentration (ppm) of the copolymers was determined by titration using a Metrohm 716 Titrino. 2 g of the polymer was dissolved in 50 ml of o-cresol/chloroform mixture (67:20 v/v) by heating to not more than 100° C. on a stirrer hot plate. 5.0 ml of 0.05M ethanolic NaOH (1M NaOH in methylated spirit 5:95 v/v) was then added to the solution. The titration was performed against ethanolic hydrochloric acid (1M HCl in methylated spirit 5:95 v/v).

Differential Scanning Calorimetry (DSC)

The thermal behavior of the polyesters was examined by differential scanning calorimetry (DSC) using a Perkin Elmer 7 and calibrated using an indium standard. A 10 mg sample was used, with heating and cooling rates set at 20° C./min and 10° C./min respectively under nitrogen.

XRF (Sb/Co/P)

Analysis of PET for antimony (Sb), cobalt (Co), and phosphorous (P) was performed using a Spectro (UK Ltd) XRF.

EXAMPLES

The following examples further illustrate the present invention.

Example 1

PET copolymers were prepared by esterification, polycondensation, and solid state polymerization according to Methods 1 and 4. The following formulations, summarized in Table 4, were used to examine the effect of 5-nitroisophthalic acid (NIPA) and isophthalic acid (IPA) on solid state polymerization (SSP) performance.

TABLE 4

Formulations of Example 1*

| Mole % IPA | Mole % NIPA | $H_3PO_4$ ppm | $H_3PO_3$ ppm | $Sb_2O_3$ ppm | CoAc ppm |
|---|---|---|---|---|---|
| 2 | 0 | 160 | 30 | 280 | 220 |
| 1.9 | 0.1 | 160 | 30 | 280 | 220 |
| 1.5 | 0.5 | 160 | 30 | 280 | 220 |
| 1 | 1 | 160 | 30 | 280 | 220 |
| 0 | 2 | 160 | 30 | 280 | 220 |

*All levels are as added.

All samples were prepared on the 500 g Batch Laboratory SSP Rig, according to method 4a, and reactivity data was measured by melt viscometery. The results are summarized in FIG. 1 and Table 5.

TABLE 5

Analytical Results for Formulations of Example 1

| Mole % IPA | Mole % NIPA | SSP Rate IV/Hr | Cobalt ppm | P ppm | Sb ppm | CEG ppm | HEG per 100 Units | HEG ppm | HEG:CEG Ratio | DEG Mole % |
|---|---|---|---|---|---|---|---|---|---|---|
| 2 | 0 | 0.017 | 46 | 37 | 184 | 25 | 0.9 | 46.88 | 1.88 | 2.7 |
| 1.9 | 0.1 | 0.0291 | 50 | 58 | 199 | 23 | | | | 3.08 |
| 1.5 | 0.5 | 0.0347 | 52 | 38 | 187 | 29 | | | | 3.43 |
| 1 | 1 | 0.0613 | 49 | 46 | 195 | 23 | | | | 3.48 |
| 0 | 2 | 0.0898 | — | — | — | | | | | |

Conclusions from Example 1

All copolymers featuring levels of NIPA between 0.1 and 2 Mole % demonstrated higher SSP rates as compared to the 2% IPA reference copolymer. All measured parameters were within the accepted range for polyester copolymers produced in this manner.

It is believed that part of this apparently large increase in SSP reactivity may have been the result of the nitro group impacting on the rheological behavior of the polymer. To establish whether this effect was significant, a 2% dimethyl 5-nitroisophthalate (DMNI) material (see Table 6 below) was prepared according to Methods 2 and 4. The copolymer was then studied on the 500 g Batch Laboratory SSP Rig, according to method 4a, and reactivity data was gathered using melt and solution viscometry. This data is illustrated graphically in FIG. 2

TABLE 6

Formulations for Studying the Impact of the Nitro Group on the Rheological Behavior of Selected Polymers*

| Mole % DMNI | $H_3PO_4$ ppm | $H_3PO_3$ ppm | $Sb_2O_3$ ppm | CoAc ppm |
|---|---|---|---|---|
| 0 | 160 | 30 | 280 | 220 |
| 2 | 160 | 30 | 280 | 220 |

*All levels are as added.

Figure 2:
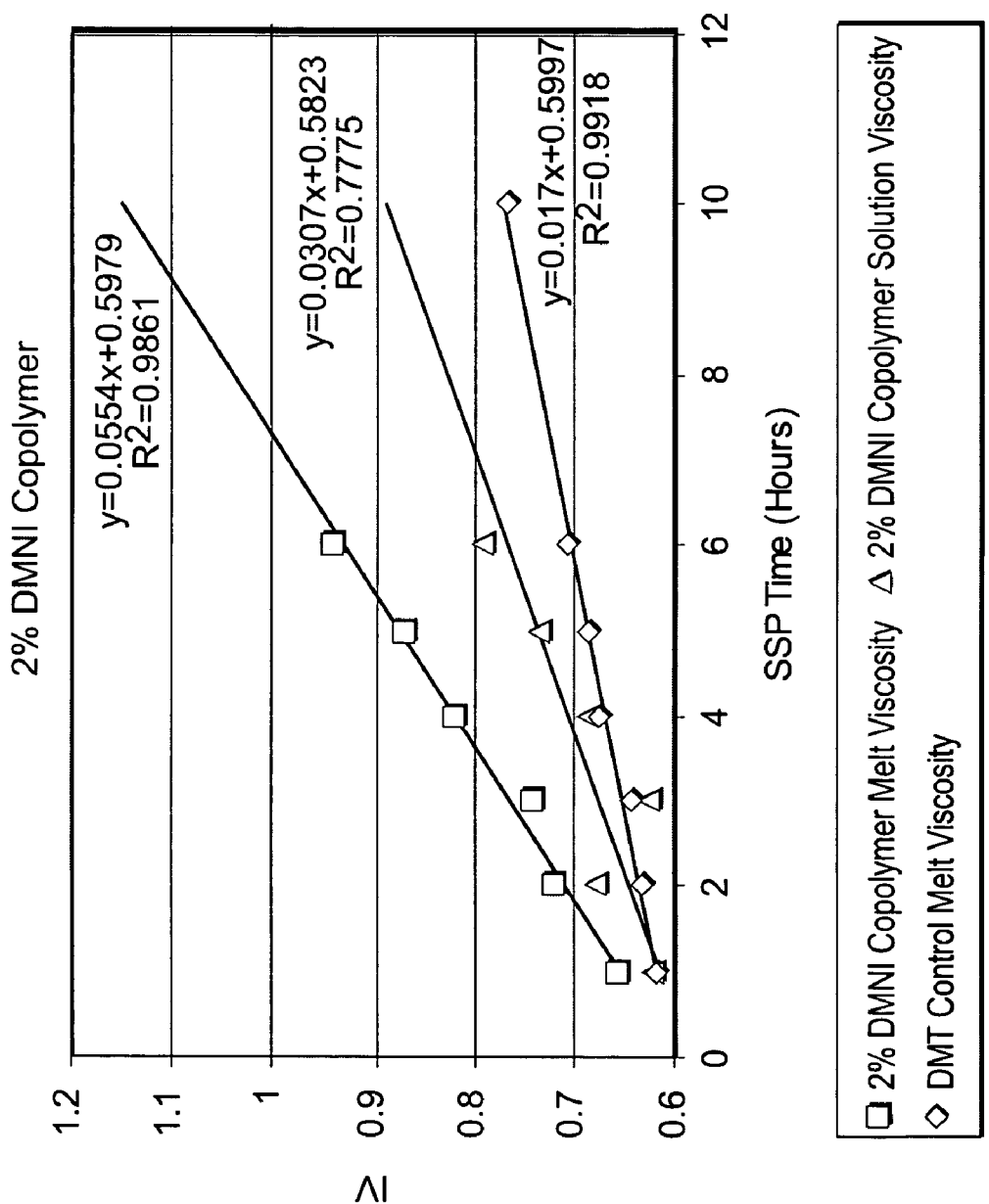
FIG. 2 is a plot of solid state polymerization reactivity rates for formulations used to study the impact of the nitro group on the rheological behavior of selected polymers.

As can be seen from FIG. 2, there was a considerable difference between the SSP rates measured by melt and solution viscosity suggesting that the nitro group was indeed impacting the melt rheology of this copolymer. However, there was still a significant difference between the dimethyl terephthalate (DMT) MV control and the 2% DMNI, measured by solution viscometry, indicating that the actual SSP reactivity had indeed been improved.

Example 2

PET copolymers were prepared by esterification, polycondensation, and solid state polymerization according to Methods 2 and 4. The following formulations, summarized in Table 7, were used to examine the effect of DMNI on solid state polymerization (SSP) performance relative to a homopolymer.

TABLE 7

Formulations of Example 2*

| Mole % DMNI | $H_3PO_4$ ppm | $H_3PO_3$ ppm | $Sb_2O_3$ ppm | CoAc ppm |
|---|---|---|---|---|
| 0 | 160 | 30 | 280 | 220 |
| 2 | 160 | 30 | 280 | 220 |
| 1 | 160 | 30 | 280 | 220 |
| 0.5 | 160 | 30 | 280 | 220 |

*All levels are as added.

Figure 3:
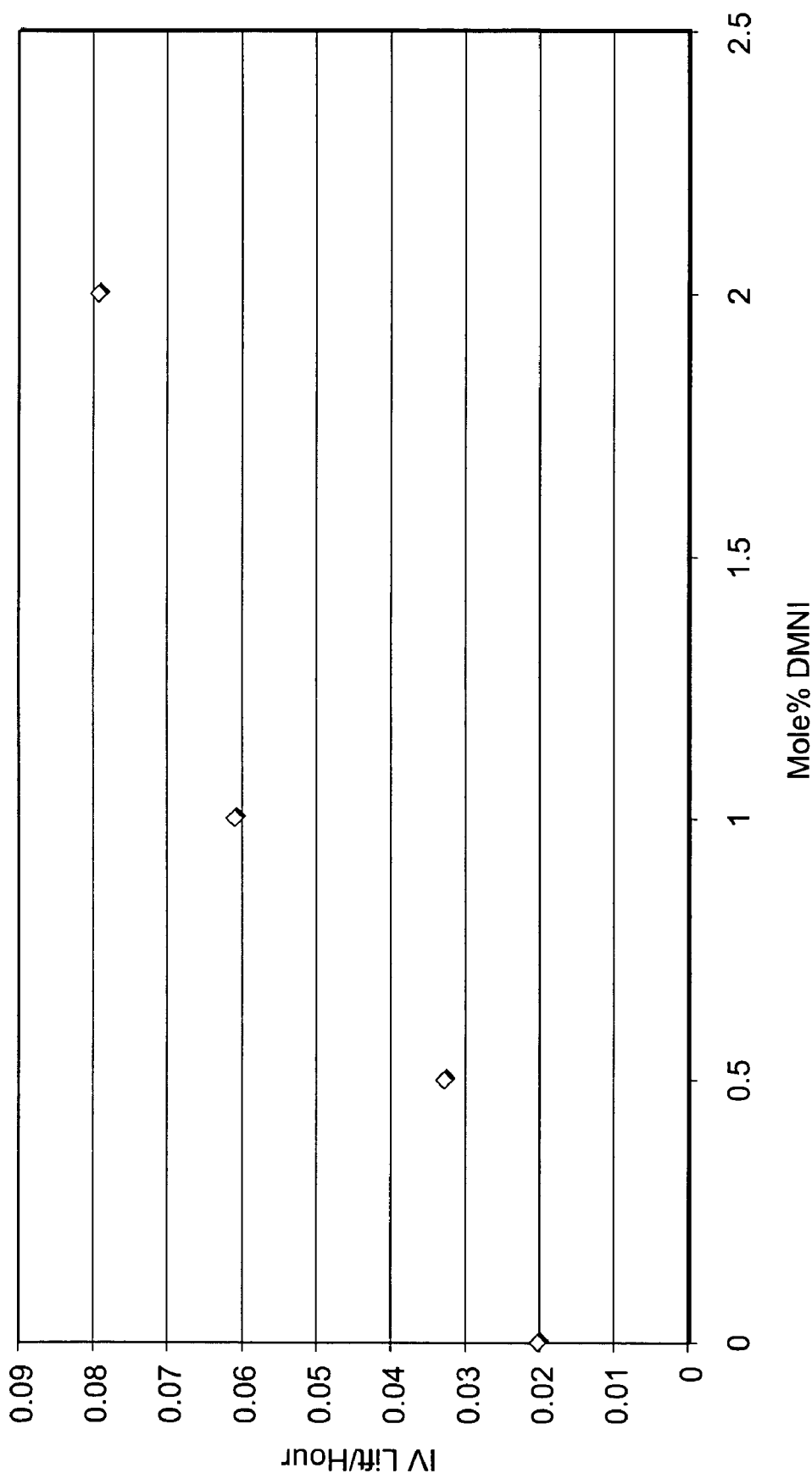
FIG. 3 is a plot of solid state polymerization reactivity rates for formulations of Example 2.

All samples were prepared on the 500 g Batch Laboratory SSP Rig, according to Method 4a and reactivity data was measured by melt viscometry. The results are summarized in FIG. 3 and Table 8.

TABLE 8

Analytical Results for Formulations of Example 2

| Mole % DMNI | SSP Rate IV/Hr | Cobalt ppm | P ppm | Sb ppm | CEG ppm | HEG per 100 Units | HEG ppm | HEG:CEG Ratio | DEG Mole % |
|---|---|---|---|---|---|---|---|---|---|
| 0 | 0.0203 | 20 | 49 | 188 | 20 | — | — | — | 1.22 |
| 2 | 0.0793 | 44 | 50 | 214 | 28.3 | 1.7 | 88.54 | 3.13 | 1.33 |
| 1 | 0.061 | 46 | 52 | 197 | 24.2 | — | — | — | 1.33 |
| .5 | 0.0329 | 45 | 53 | 201 | 22.9 | — | — | — | 1.27 |

Conclusions from Example 2

All DMNI copolymers demonstrated significantly higher SSP rates versus the homopolymer standard formulation when measured by melt viscometry. All measured parameters were within the accepted range for polyester copolymers produced in this manner.

Based on the above data, it is believed that the nitro group impacts on melt rheology, and therefore melt viscosity measurements. Although all reactivity data gathered in this set of experiments was measured using melt viscometry, it is believed that the rate enhancements cannot be explained by this phenomenon alone, and that the presence of the nitro group has impacted positively on SSP reactivity.

Example 3

A series of PET copolymers were prepared by direct esterification, polycondensation, and solid state polymerization according to Methods 1 and 4. The following formulations, summarized in Table 9, were used to highlight the differences between the solid state polymerization (SSP) performance of IPA relative to 5-tertiary butyl isophthalic acid (tBIPA).

TABLE 9

Formulations of Example 3*

| Mole % tBIPA | Mole % IPA | $H_3PO_4$ ppm | $H_3PO_3$ ppm | $Sb_2O_3$ ppm | CoAc ppm |
|---|---|---|---|---|---|
| 0 | 0 | 200 | 30 | 250 | 165 |
| 1 | 0 | 200 | 30 | 250 | 165 |
| 1.67 | 0 | 200 | 30 | 250 | 165 |
| 2 | 0 | 200 | 30 | 250 | 165 |
| 3 | 0 | 200 | 30 | 250 | 165 |
| 4 | 0 | 200 | 30 | 250 | 165 |
| 0 | 1 | 200 | 30 | 250 | 165 |
| 0 | 1.67 | 200 | 30 | 250 | 165 |
| 0 | 2 | 200 | 30 | 250 | 165 |
| 0 | 3 | 200 | 30 | 250 | 165 |
| 0 | 4 | 200 | 30 | 250 | 165 |

*All levels are as added.

Figure 4:
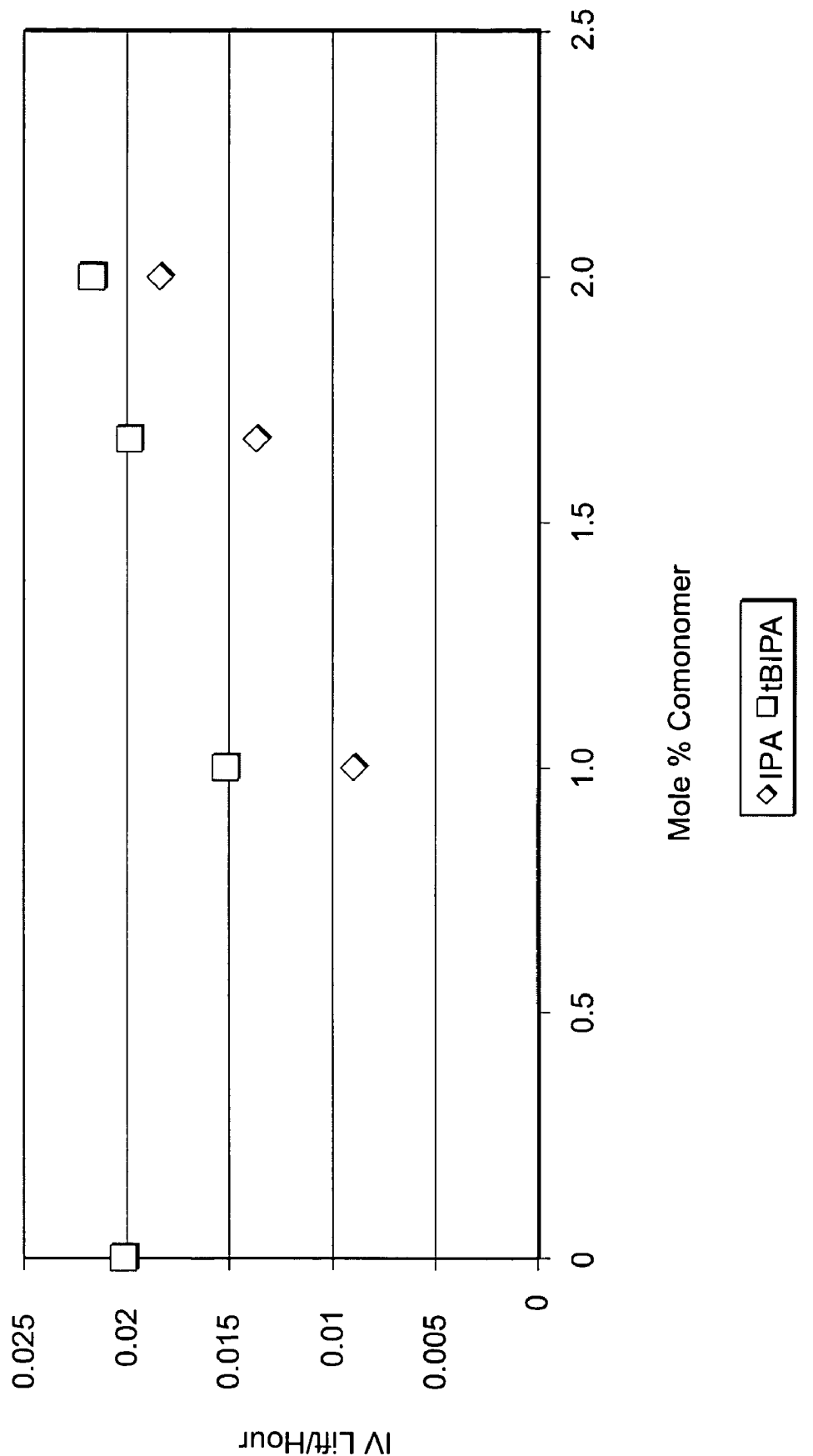
FIG. 4 is a plot of solid state polymerization reactivity rates for formulations of Example 3 using the 500 g Batch Laboratory SSP Rig.
Figure 5:
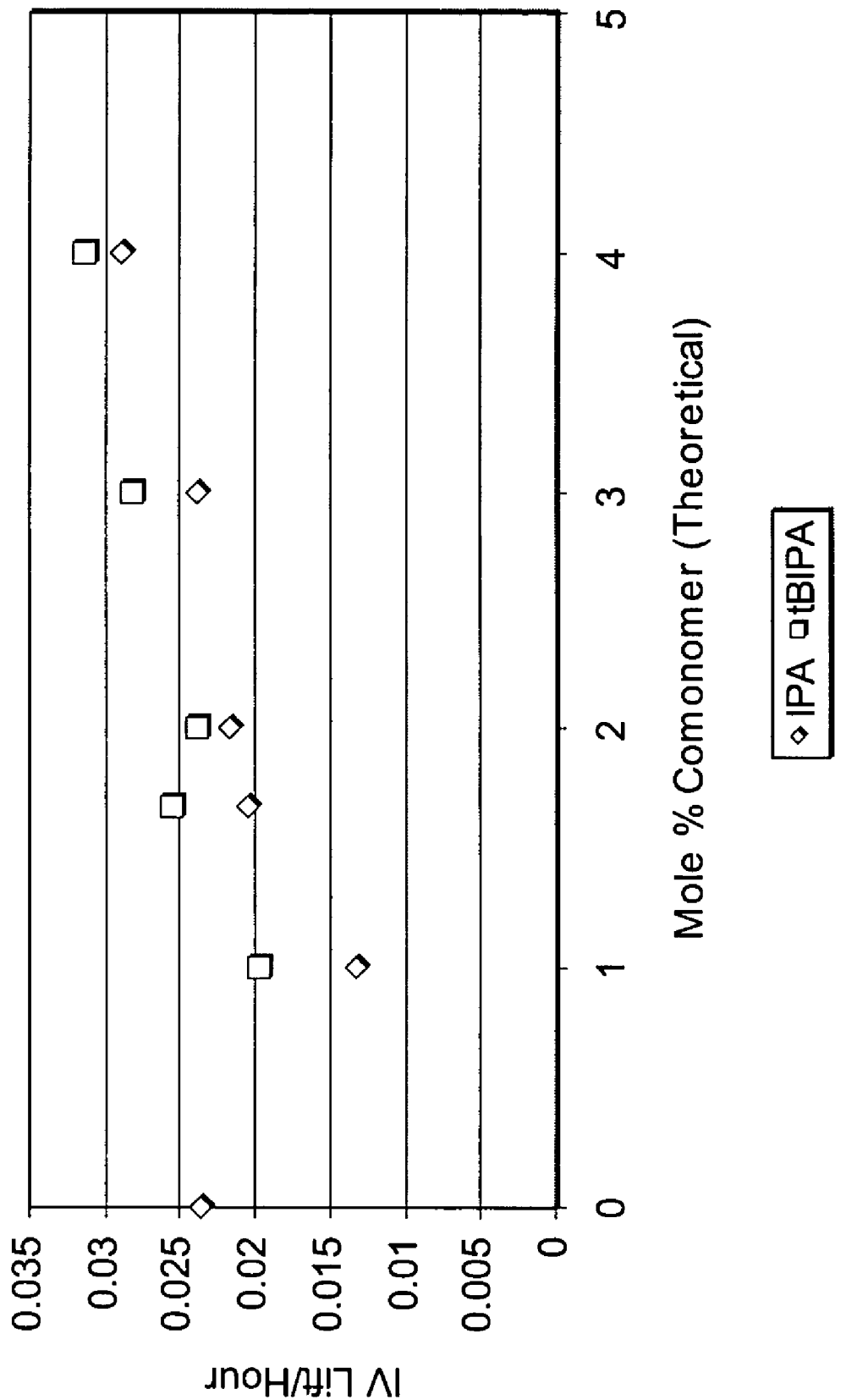
FIG. 5 is a plot of solid state polymerization reactivity rates for formulations of Example 3 using the 40 Kg Batch Laboratory SSP Rig.

The SSP performance of the resins was studied on the 500 g Batch Laboratory SSP Rig and the 40 Kg Batch Laboratory SSP Rig. The methods used are detailed in Methods 4a and 4b respectively. All rates were assessed by melt viscometry unless otherwise stated. The results for the 40 Kg Laboratory SSP Rig are summarized in FIG. 4. The results for the 500 g Laboratory SSP Rig are summarized in FIG. 5 and Table 10.

Consistently higher SSP rates for tBIPA copolymers in 0.1 to 2 Mole % range were observed when compared with equivalent level IPA copolymers.

Consistently higher SSP rates for tBIPA copolymers in 0.1 to 4 Mole % range were observed when compared with equivalent level IPA copolymers.

TABLE 10

Analytical Results for Formulations of Example 3 Using the 500 g Batch Laboratory SSP Rig

| Mole % tBIPA | Mole % IPA | SSP Rate IV/Hr | Cobalt ppm | P ppm | Sb ppm | CEG ppm | HEG per 100 Units | HEG ppm | HEG:CEG Ratio | DEG Mole % |
|---|---|---|---|---|---|---|---|---|---|---|
| 0 | 0 | 0.0237 | 41 | 58 | 258 | 26.35 | 0.91 | 47.40 | 1.80 | 2.02 |
| 1 | 0 | 0.0199 | 41 | 59 | 183 | 38.04 | 0.81 | 42.19 | 1.11 | 1.98 |
| 1.67 | 0 | 0.0256 | 39 | 47 | 212 | 20.47 | 0.93 | 48.44 | 2.37 | 2.01 |
| 2 | 0 | 0.0239 | 40 | 53 | 158 | 31.94 | 0.68 | 35.42 | 1.11 | 1.93 |
| 3 | 0 | 0.0283 | 40 | 53 | 220 | 20.81 | 0.94 | 48.96 | 2.35 | 2.12 |
| 4 | 0 | 0.0314 | 39 | 51 | 172 | 35.04 | 0.62 | 32.29 | 0.92 | 1.8 |
| 0 | 1 | 0.0133 | 43 | 57 | 184 | 61.83 | 0.37 | 19.27 | 0.31 | 1.88 |
| 0 | 1.67 | 0.0205 | 41 | 50 | 173 | 31.07 | 0.83 | 43.23 | 1.39 | 1.93 |
| 0 | 2 | 0.0218 | 42 | 45 | 174 | 30.6 | 0.84 | 43.75 | 1.43 | 1.81 |
| 0 | 3 | 0.0239 | 39 | 58 | 232 | 26.42 | 0.91 | 47.40 | 1.79 | 1.93 |
| 0 | 4 | 0.0289 | 40 | 61 | 215 | 41.7 | 0.64 | 33.33 | 0.80 | 1.97 |

Conclusions from Example 3

Copolymers featuring tBIPA demonstrated consistently higher SSP rates versus equivalent level IPA copolymers using both the 500 g Batch Laboratory SSP Rig and the 40 Kg Batch Laboratory SSP Rig. All measured parameters were within the accepted range for polyester copolymers produced in this manner.

Example 4

Figure 6:
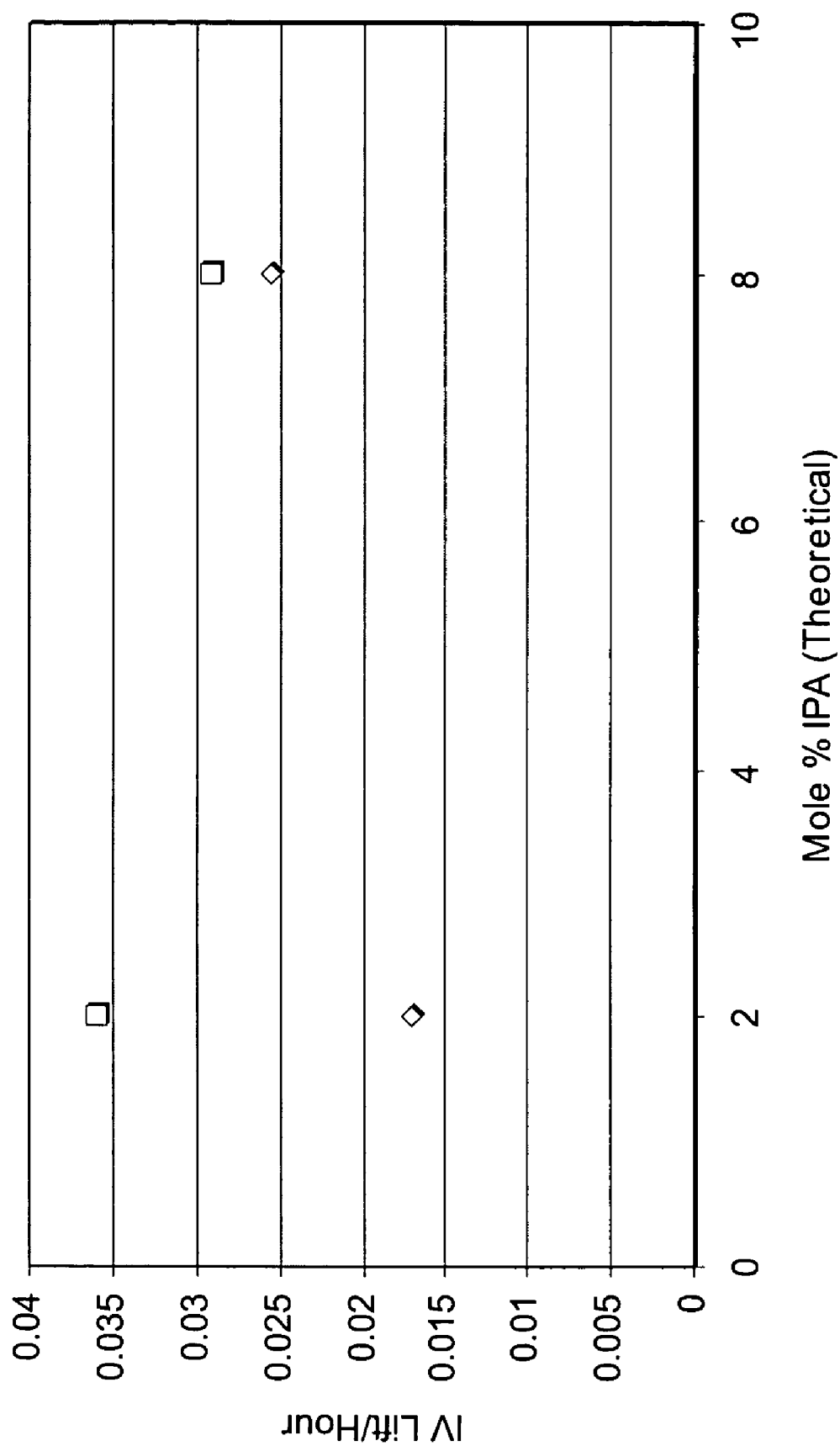
FIG. 6 is a plot of solid state polymerization reactivity rates for formulations of Example 4.

Four PET copolymers were prepared by direct esterification, polycondensation, and solid state polymerization according to Methods 1 and 4a. The following formulations, summarized in Table 11, were used to verify the differences between the solid state polymerization (SSP) performance of IPA relative to tBIPA. The results are summarized in FIG. 6 and Table 12.

TABLE 11

Formulations of Example 4*

| Mole % tBIPA | Mole % IPA | $H_3PO_4$ ppm | $H_3PO_3$ ppm | $Sb_2O_3$ ppm | CoAc ppm |
|---|---|---|---|---|---|
| 2 | 0 | 160 | 30 | 280 | 220 |
| 8 | 0 | 160 | 30 | 280 | 220 |
| 0 | 2 | 160 | 30 | 280 | 220 |
| 0 | 8 | 160 | 30 | 280 | 220 |

*All levels are as added.

TABLE 12

Analytical Results for Formulations of Example 4

| Mole % tBIPA | Mole % IPA | SSP Rate IV/Hr | Cobalt ppm | P ppm | Sb ppm | CEG ppm | HEG per 100 Units | HEG ppm | HEG:CEG Ratio | DEG Mole % |
|---|---|---|---|---|---|---|---|---|---|---|
| 2 | 0 | 0.036 | 40 | 42 | 188 | 27 | 1 | 52.08 | 1.93 | 3.4 |
| 8 | 0 | 0.0292 | 27 | 36 | 190 | 23 | 0.9 | 46.88 | 2.04 | 2.4 |
| 0 | 2 | 0.017 | 46 | 37 | 184 | 25 | 0.9 | 46.88 | 1.88 | 2.7 |
| 0 | 8 | 0.0255 | 24 | 47 | 183 | 24 | 1 | 52.08 | 2.17 | 2.9 |

Conclusions from Example 4

Both tBIPA copolymers demonstrated higher SSP rates versus the equivalent level IPA copolymers. All measured parameters were within the accepted range for polyester copolymers produced in this manner although the higher DEG in the 2% tBIPA formulation may have further increased the SSP rate differences for the purposes of this comparison.

Example 5

Figure 7:
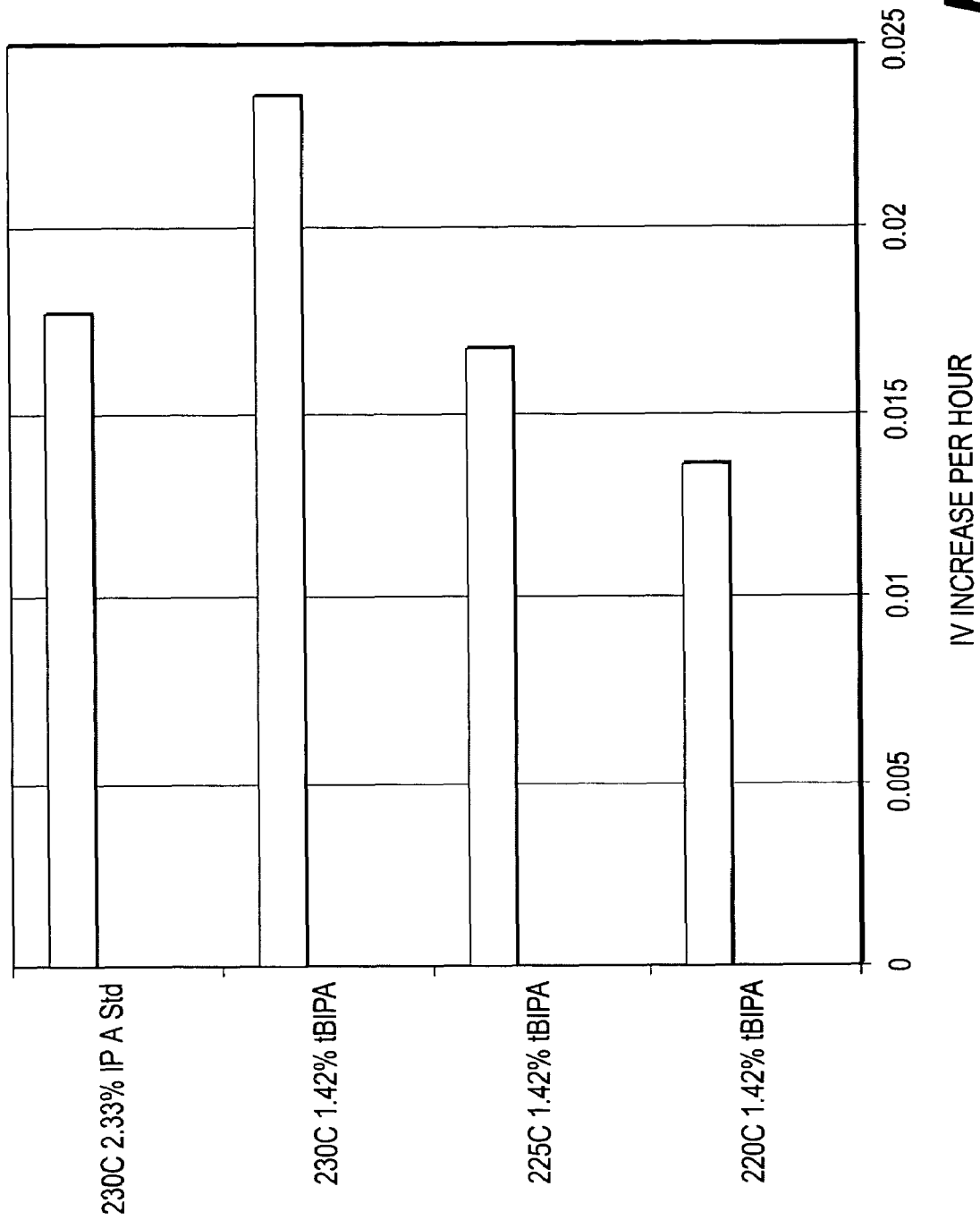
FIG. 7 is a plot of solid state polymerization reactivity rates for formulations of Example 5.

Two PET copolymers were prepared by direct esterification, polycondensation, and solid state polymerization according to Methods 3 and 5. The two formulations used were standard formulations with levels of 1.42 Mole % tBIPA and 2.33 Mole % IPA respectively. The results are summarized in FIG. 7 and Table 13.

TABLE 13

Analytical Results for Formulations of Example 5

| Mole % tBIPA | Mole % IPA | Cobalt ppm | P ppm | Sb ppm | CEG ppm | HEG per 100 Units | HEG ppm | HEG:CEG Ratio | DEG Mole % |
|---|---|---|---|---|---|---|---|---|---|
| 1.42 | 0 | 1.7 | 6.7 | 281 | 83 | 3.5 | 182.29 | 2.20 | 1.45 |
| 0 | 2.33 | 1.5 | 0 | 241 | 176 | 3.5 | 182.29 | 1.04 | 1.44 |

Conclusions from Example 5

The 1.42 Mole % tBIPA copolymer demonstrated a significantly higher SSP rate when compared with the 2.33 Mole % IPA copolymer at a temperature of 230° C. This rate enhancement may allow a reduction in SSP temperature, while maintaining reactor throughput, with potential benefits in processing characteristics.

We claim:

1. A method for increasing the rate of solid state polymerization for polyethylene terephthalate (PET), which comprises: (i) directly esterifying or transesterifying, then copolymerizing in the melt, at temperatures between 250° C. and 310° C., with the other PET precursor materials at least one monomeric unit selected from the group consisting of diols, diacids and dimethyl esters that contain at least one pendant side group selected from the group consisting of tertiary butyl, hexyl, pentyl, butyl, propyl, ethyl, methyl, nitrosyl ($NO_2$) and sulfonyl ($SO_2$) groups to form a polymer feedstock; and
   (ii) solid state polymerizing the polymer feedstock under heated nitrogen and/or air at a temperature between 160° C. and 230° C.

2. The method of claim 1, wherein said at least one pendant side group is selected from tertiary butyl groups.

3. The method of claim 1, wherein said at least one pendant side group is selected from nitrosyl ($NO_2$) groups.

4. The method of claim 2, wherein said at least one monomeric unit comprises tertiary butyl isophthalic acid in an amount from about 0.1 to about 8 mole percent of the total diacid content of the PET.

5. The method of claim 3, wherein said at least one monomeric unit comprises 5-nitrosisoisophthalic acid in an amount from about 0.05 to about 8 mole percent of the total diacid content of the PET.

6. The method of claim 3, wherein said at least one monomeric unit comprises dimethyl 5-nitroisophthalate.

7. The method of claim 1, wherein the solid state polymerization is carried out at a temperature in the range of from about 200° C. to 230° C. and the intrinsic viscosity is increased at an average rate that is at least five percent greater than the average intrinsic viscosity rate increase for solid state polymerization of a PET feedstock in the absence of at least one monomeric unit that comprises at least one pendant side group.

8. The method of claim 7, wherein the average intrinsic viscosity rate increase is at least about 0.03 dL/g per hour.

* * * * *